United States Patent
Kim et al.

(10) Patent No.: US 11,368,303 B2
(45) Date of Patent: Jun. 21, 2022

(54) SYSTEM AND METHOD FOR CALCULATING FASTER ECC SCALAR MULTIPLICATION ON FPGA

(71) Applicant: Pusan National University Industry—University Cooperation Foundation, Busan (KR)

(72) Inventors: Howon Kim, Busan (KR); Asep Muhamad Awaludin, Busan (KR); Youngyeo Yun, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 0 days.

(21) Appl. No.: 17/510,844

(22) Filed: Oct. 26, 2021

(65) Prior Publication Data

US 2022/0166619 A1 May 26, 2022

(30) Foreign Application Priority Data

Nov. 23, 2020 (KR) .................. 10-2020-0158242

(51) Int. Cl.
*H04L 9/30* (2006.01)
*G06F 7/72* (2006.01)
(Continued)

(52) U.S. Cl.
CPC ............ *H04L 9/3066* (2013.01); *G06F 7/725* (2013.01); *G06F 21/76* (2013.01); *H04L 9/002* (2013.01); *G06F 2207/7219* (2013.01)

(58) Field of Classification Search
CPC ..... H04L 9/00; H04L 9/30; H04L 9/28; H04L 63/10; H04L 9/3066; H04L 9/002;
(Continued)

(56) References Cited

U.S. PATENT DOCUMENTS

| 7,509,486 B1 * | 3/2009 | Chin ................. G06F 7/728 380/255 |
| 7,995,752 B2 * | 8/2011 | Lambert ................. G06F 7/725 380/44 |

(Continued)

FOREIGN PATENT DOCUMENTS

| KR | 10-2010-0098017 A | 9/2010 |
| KR | 10-2012-0028432 A | 3/2012 |
| KR | 10-1925614 B1 | 12/2018 |

OTHER PUBLICATIONS

Lijuan Li and Shuguo Li, High-Performance Pipelined Architecture of Elliptic Curve Scalar Multiplication Over GF (2m), IEEE Transaction On Very Large Scale Integration (VLSI) Systems, vol. 24, No. 4, Apr. 2016, p. 1223-1232. (Year: 2016).*

(Continued)

*Primary Examiner* — Thanhnga B Truong
(74) *Attorney, Agent, or Firm* — Paratus Law Group, PLLC (57) ABSTRACT

Disclosed are a system and method for calculating elliptic curve cryptography scalar multiplication using an FPGA (Field Programmable Gate Array), the system and method scheduling calculation, which is used in a Montgomery ladder Algorithm, and enabling efficient calculation through an improved modular arithmetic calculation method. The system for calculating elliptic curve cryptography (ECC) scalar multiplication using an FPGA includes: a scheduler implementing Montgomery ladder step calculation in a pipeline structure; a pipeline modular adder/subtractor implementing n-bit modular addition in a d-stage pipeline structure; and a modular multiplier implementing n-bit modular multiplication in a 10-stage pipeline structure up to maximum 256 bits.

7 Claims, 6 Drawing Sheets

(51) Int. Cl.
  *G06F 21/76* (2013.01)
  *H04L 9/00* (2022.01)
(58) Field of Classification Search
  CPC ......... H04K 1/00; G06F 12/14; G06F 16/178;
      G06F 15/21; G06F 16/162; G06F 16/125;
      G06F 16/122; G06F 16/1734; G06F
      16/6218; G06F 7/725; G06F 21/76
  See application file for complete search history.

(56) References Cited

U.S. PATENT DOCUMENTS

| | | | | |
|---|---|---|---|---|
| 8,750,500 | B2* | 6/2014 | Brown | G06F 7/725 380/30 |
| 2015/0092941 | A1* | 4/2015 | Ghosh | G06F 12/1408 380/30 |

OTHER PUBLICATIONS

Korean Office Action for related KR Application No. 10-2020-0158242 dated Dec. 6, 2021 from Korean Intellectual Property Office.
Dong-Seong Kim et al., "Montgomery Multiplier Supporting Dual-Field Modular Multiplication", JKIICE Journal of the Korea Institute of Information and Communication Engineering, Jun. 24, 2020, pp. 736-743, vol. 24, No. 6.

* cited by examiner

SYSTEM AND METHOD FOR CALCULATING FASTER ECC SCALAR MULTIPLICATION ON FPGA

CROSS-REFERENCE TO RELATED APPLICATION

This application claims priority to Korean Patent Application No. 10-2020-0158242 (filed on Nov. 23, 2020), which is hereby incorporated by reference in its entirety.

BACKGROUND

The present disclosure relates to an elliptic curve cryptography system and, more particularly, to a system and method for calculating ECC scalar multiplication using an FPGA (Field Programmable Gate Array), the system and method scheduling calculation, which is used in a Montgomery ladder Algorithm, and enabling efficient calculation through an improved modular arithmetic calculation method.

With the advent of an information-oriented society, it is increasingly important to protect information using encryption algorithms and encryption protocols.

Public-key encryption algorithm, such as RSA and ECC, has been used in internet and finance to keep data secure by using two mathematically related keys (asymmetric).

ECC uses a small key size and has the same security level, as compared with other public-key encryption system. Since a smaller key is used, there is an advantage in terms of calculation time, power consumption, and storage space.

Elliptic curve scalar multiplication obtains a point Q on an elliptic curve by multiplying a point P on the elliptic curve by a scalar constant k.

Multiplying P by k is the same as performing k times of elliptical curve addition on P.

This is defined as Q=kP=P+P+ . . . +P (k times)

However, the ECC system of the related art has limitation in resistance against a side-channel attack calculation speed, and cost, so improvement is required.

Accordingly, it is required to develop a new technology that enables efficient calculation by increasing resistance against a side-channel attack and reducing the number of times of calculation that takes long time.

PRIOR ART DOCUMENT

Patent Document (Patent Document 1) Korean Patent Application Publication No. 10-2012-0028432
(Patent Document 2) Korean Patent No. 10-1925614
(Patent Document 3)) Korean Patent Application Publication No. 10-2010-0098017

SUMMARY

The present disclosure has been made in an effort to solve the problems of the ECC system of the related art and an object of the present disclosure is to provide a system and method for calculating ECC scalar multiplication using an FPGA (Field Programmable Gate Array), the system and method scheduling calculation, which is used in a Montgomery ladder algorithm, and enabling efficient calculation through an improved modular arithmetic calculation method.

Another object of the present invention is to provide a system and method for calculating ECC scalar multiplication using an FPGA (Field Programmable Gate Array), the system and method increasing resistance against a side-channel attack by performing elliptic curve scalar multiplication using a Montgomery ladder.

Another object of the present invention is to provide a system and method for calculating ECC scalar multiplication using an FPGA (Field Programmable Gate Array), the system and method enabling efficient calculation by reducing the number of times of calculation that takes long time by changing a coordinate system.

Another object of the present invention is to provide a system and method for calculating ECC scalar multiplication using an FPGA (Field Programmable Gate Array), the system and method improving the safety of an encryption system and making it easy to change an internal algorithm by using an FPGA.

Another object of the present invention is to provide a system and method for calculating ECC scalar multiplication using an FPGA (Field Programmable Gate Array), the system and method improving performance by implementing modular arithmetic calculation used for a Montgomery ladder algorithm into a pipeline structure, and providing a flexible structure that can be replaced at a low cost and has a safe structure in comparison to the case of implementing it as software by implementing an FPGA.

The objects of the present disclosure are not limited to those described above and other objects may be made apparent to those skilled in the art from claims.

In order to achieve an object, a system for calculating elliptic curve cryptography (ECC) scalar multiplication using an FPGA according to the present disclosure includes an improved Montgomery ladder scheduling; a pipeline modular adder/subtractor implementing n-bit modular addition in a d-stage pipeline structure; and a modular multiplier implementing n-bit modular multiplication in a 10-stage pipeline structure up to maximum 256 bits.

In order to achieve another object, a method for calculating ECC scalar multiplication using an FPGA according to the present disclosure includes: partial product of a mixed Karatsuba algorithm using a digital signal processor by means of the multiplier; an accumulation step of mapping intermediate multiplication results; and a step of reducing the accumulated results into a modular space, in order for Montgomery ladder step calculation in a system for calculating ECC scalar multiplication including a Montgomery algorithm scheduler, a modular adder, and a modular multiplier.

The system and method for calculating ECC scalar multiplication using an FPGA according to the present disclosure have the following effects.

First, it is possible to schedule calculation, which is used in a Montgomery ladder algorithm, and enable efficient calculation through an improved arithmetic calculation method.

Second, it is possible to increase resistance against a side-channel attack by performing elliptic curve scalar multiplication using a Montgomery ladder algorithm.

Third, it is possible to enable efficient calculation by reducing the number of times of calculation that takes long time by changing a coordinate system.

Fourth, it is possible to improve safety of an encryption system and make it easy to change an internal algorithm by using an FPGA.

Fifth, it is possible to improve performance by implementing modular arithmetic calculation used for a Montgomery ladder algorithm into a pipeline structure, and provide a flexible structure that can be replaced at a low cost and has a safe structure in comparison to the case of implementing it as software by implementing an FPGA.

DETAILED DESCRIPTION

Hereafter, a preferred embodiment of a system and method for calculating ECC scalar multiplication using an FPGA according to the present disclosure is described in detail.

The characteristics and advantages of the system and method for calculating ECC scalar multiplication using an FPGA according to the present disclosure will be made clear through the following detailed description of each embodiment.

Figure 1:
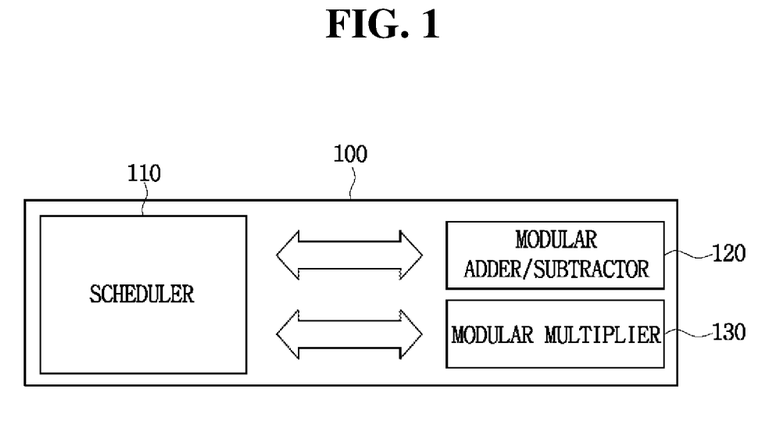
FIG. 1 is a configuration diagram of a calculation system for ECC scalar multiplication using an FPGA according to the present disclosure.

FIG. 1 is a configuration diagram of a calculation system for ECC scalar multiplication using an FPGA according to the present disclosure.

The system and method for calculating ECC scalar multiplication are configured with compact scheduling, which is used in a Montgomery ladder algorithm, and to enable efficient calculation through an improved modular arithmetic calculation method.

The present disclosure improves performance by implementing modular arithmetic calculation used for a Montgomery ladder algorithm into a pipeline structure, and provides a flexible structure that can be replaced at a low cost and has a safe structure in comparison to the case of implementing it as software by implementing an FPGA.

The system ECC scalar multiplication according to an embodiment of the present disclosure includes a compact scheduler of Montgomery ladder algorithm, a modular adder/subtractor, and a modular multiplier.

The modular multiplier performs an intermediate multiplication step of a mixed Karatsuba algorithm using a digital signal processor; and an accumulation step of mapping intermediate multiplication results; and a step of reducing the accumulated results into a modular space.

In the system for calculating elliptic curve cryptography (ECC) scalar multiplication using an FPGA according to the present invention, as shown in FIG. 1, a Montgomery ladder calculation system 100 for ECC scalar multiplication includes; a scheduler 110 implementing Montgomery ladder step calculation in a pipeline structure; a pipeline modular adder/subtractor 120 implementing n-bit modular addition in a d-stage pipeline structure; and a modular multiplier 130 implementing n-bit modular multiplication in a 10-stage pipeline structure up to maximum 256 bits.

A method for calculating ECC scalar multiplication using an FPGA according to the present disclosure is as follows.

The system for calculating ECC scalar multiplication includes a Montgomery algorithm scheduler, a modular adder/subtractor, and a modular multiplier, may include partial product of a mixed Karatsuba algorithm using a digital signal processor by means of the multiplier, an accumulation step of mapping intermediate multiplication results; and a step of reducing the accumulated results into a modular space.

The Montgomery ladder calculation system for ECC scalar multiplication according to an embodiment of the present disclosure includes the scheduler 110, the modular adder/subtractor 120, and the modular multiplier 130, and the detailed calculation process is as follows.

TABLE 1

| | Montgomery ladder |
|---|---|
| 1 | $(Q, R) \leftarrow (P, 2P)$ |
| 2 | $(k_{n-1}, \ldots, k_0) = (k)_2$ |
| 3 | For $i = n - 1$ down to 0: |
| 4 | If $k_i = 0$: $(Q, R) \leftarrow (2Q, Q + R)$ |
| 5 | Else: $(Q, R) \leftarrow (Q + R, 2R)$ |
| 6 | Output $Q = k \cdot P$ |

The scheduler 110 schedules Montgomery ladder step calculation (4 and 5 processes) in a pipeline structure in the Montgomery ladder algorithm shown in Table 1.

Further, in the 4 and 5 processes, the scheduler maps calculation for points P, Q, and R to points (P, Q+R, 2R)=(P, S, T) and schedules them in the algorithm of Table 2 changed into a Jacobian coordinate system.

TABLE 2

| Montgomery ladder. Input: ladder state ($X_{QP}$, $X_{RP}$, G, $Y_Q$, $Y_R$) | |
|---|---|
| 1 | $X_{QP'} = X_{QP} \cdot G$ |
| 2 | $X_{RP'} = X_{RP} \cdot G$ |
| 3 | $L = Y_Q \cdot Y_R$ |
| 4 | $H = Y_R^2$ |
| 5 | $J = X_{RP'} - L$ |
| 6 | $M = J + X_{RP'} - H$ |
| 7 | $X_{SP} = H \cdot L$ |
| 8 | $V = H \cdot (X_{QP'} - L)$ |
| 9 | $X_{TS} = X_{RP'} \cdot J + V$ |
| 10 | $Y_S = (J \cdot L + V) \cdot H$ |
| 11 | $X_{TP} = X_{TS} + X_{SP}$ |
| 12 | $Y_T = M \cdot X_{TS} + Y_S$ |
| 13 | $G' = X_{TS}^2$ |
| Output: ladder state ($X_{SP}$, $X_{TP}$, G', $Y_S$, $Y_T$) | | when $P=(x_P, y_P)$, $Q=(x_Q, y_Q)$, $R=(x_R, y_R)$, $S=(x_S, y_S)$, $T=(x_T, y_T)$, input of the formula of Table 2 is
$x_{QP}=(x_Q-x_P) \cdot Z^2$, $X_{RP}=(x_R-x_P) \cdot Z^2$, $G=(x_R-x_Q)^2 \cdot Z^4$, $y_Q=2y_Q Z^3$, $Y_R=2y_R Z^3$.

Calculation is finished by changing again the coordinate system into S(=Q+R), T(=2R) for output $X_{SP}$, $X_{TP}$, G', $Y_S$, $Y_T$ of the formula of Table 2.

The modular adder/subtractor 120 is a calculation system configuring n-bit modular addition into a d-stage pipeline structure.

In the example, it is seen that modular addition of 256 bits is calculated in a 4-stage pipeline structure.

The modular multiplier 130, which is an n-bit modular multiplier, can calculate maximum 256 bits in a 10-stage pipeline structure, and the number of stages should be added for calculation of larger bits.

Figure 2:
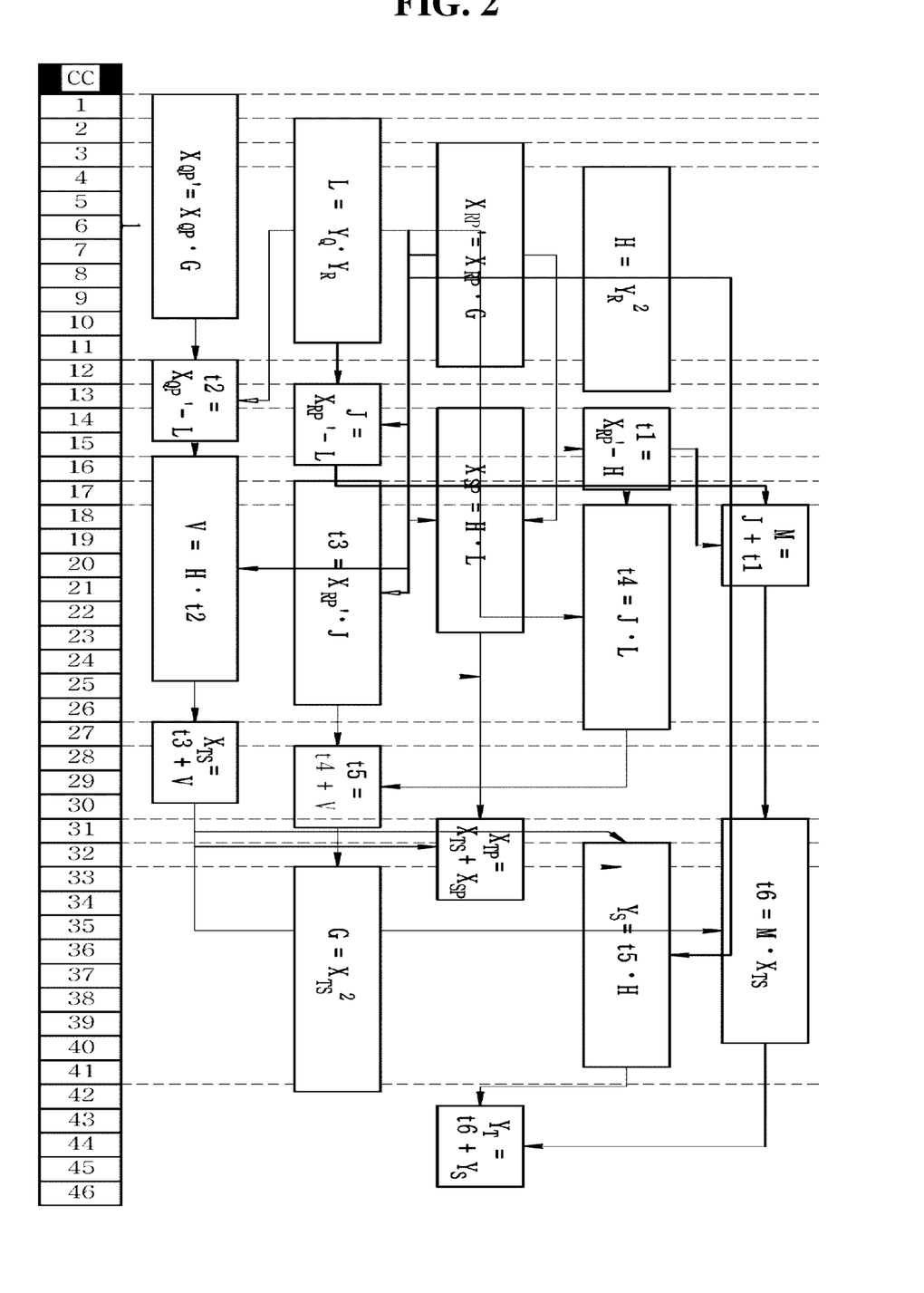
FIG. 2 is a configuration diagram showing a Montgomery ladder calculation scheduling method according to an embodiment of the present disclosure.

FIG. 2 is a configuration diagram showing a Montgomery ladder calculation scheduling method according to an embodiment of the present disclosure.

FIG. 2 is a diagram for the scheduler 110, in which Montgomery ladder step is calculated with a total of 46 clock cycles by scheduling the algorithm of the formula of Table 2 in 4-stage modular addition/subtraction and 10-stage modular multiplication.

Figure 3:
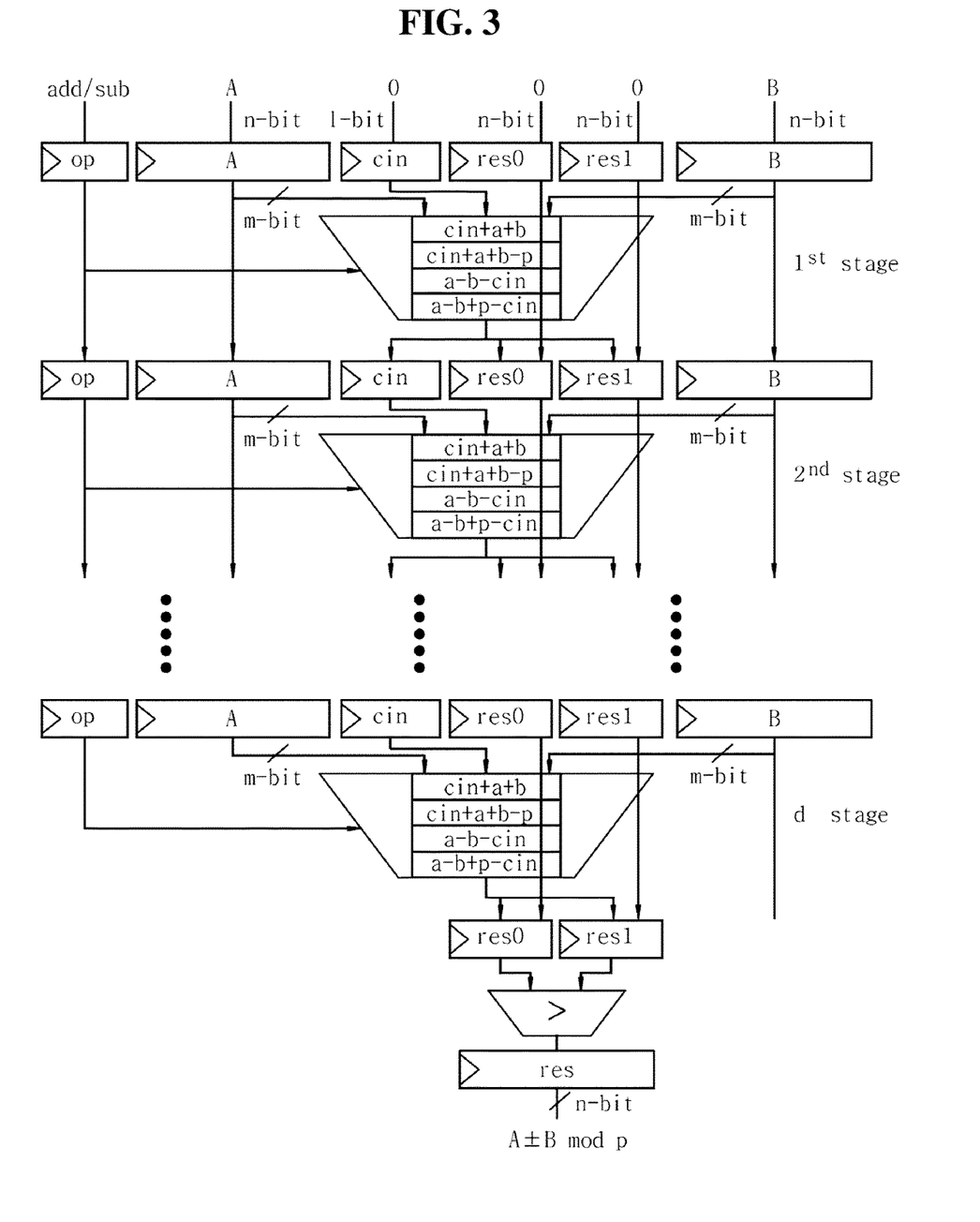
FIG. 3 is a configuration diagram of a pipeline modular addition/subtraction according to an embodiment of the present disclosure.

FIG. 3 is a configuration diagram of a pipeline modular addition/subtraction according to an embodiment of the present disclosure.

FIG. 3 is a diagram showing in detail the modular adder/subtractor 120, in which n-bit addition/subtraction is calculated in a d-stage pipeline structure.

Each pipeline stage takes m-bit input sliced from n-bit input A and B, performs an ALU operation according to the op value, and stores m-bit result in n-bit output res0 and res1 with 1-bit cin. The offset of m-bit input/output in n-bit input/output are determined according to the stage number.

When op is add, the ALU calculates (res0, res1)=(cin+a+b, cin+a+b−p), and when op is sub, ALU calculates (res0, res1)=(a−b−cin, a−b+p−cin). The final result (A±B mod p) is calculated at the last stage by selecting res from res0 or res1, by which the value is positive.

Figure 4:
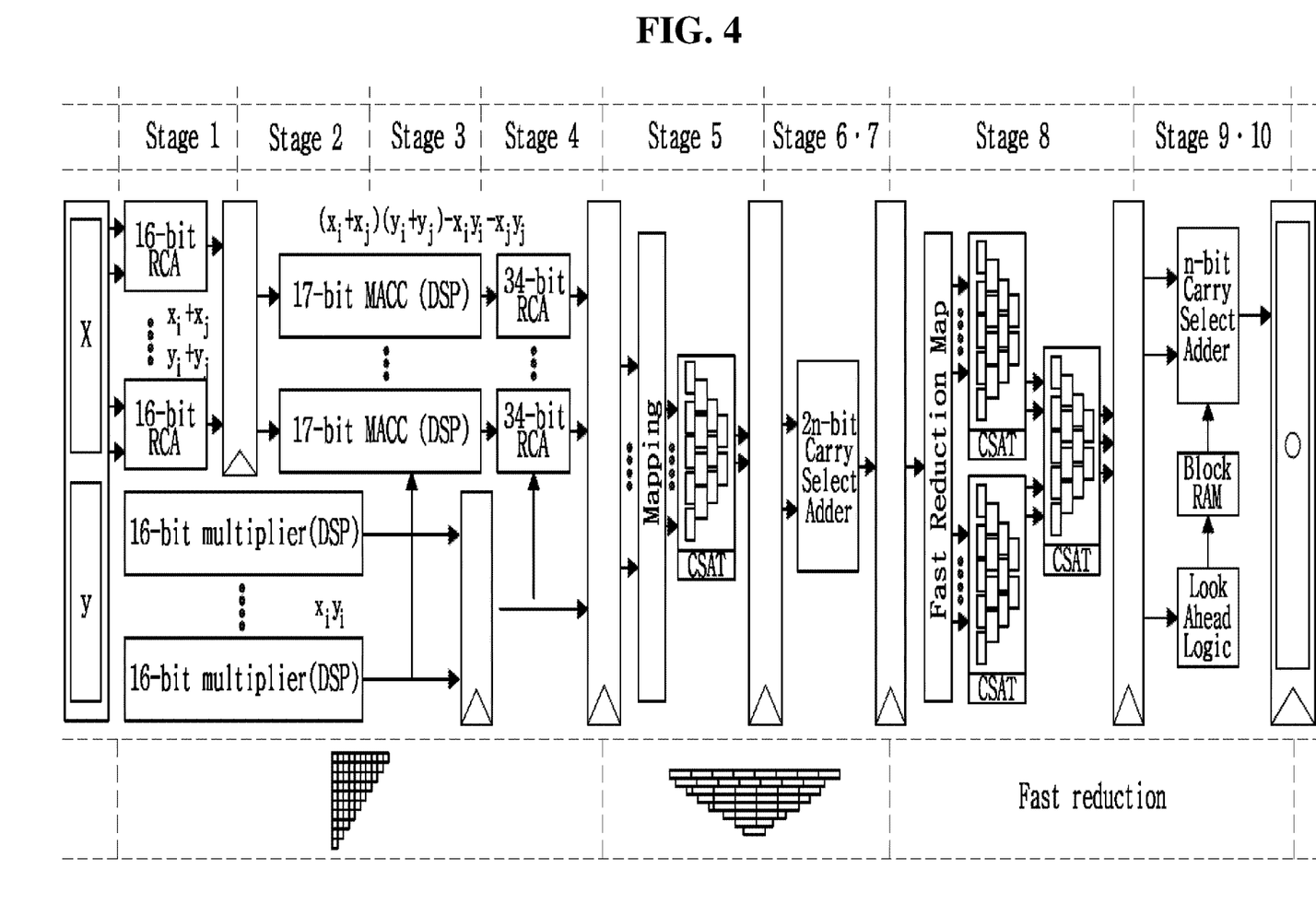
FIG. 4 is a configuration diagram of a pipeline modular multiplication calculator according to an embodiment of the present disclosure.

FIG. 4 is a configuration diagram of a pipeline modular multiplication calculator according to an embodiment of the present disclosure.

FIG. 4 is a detailed diagram of the modular multiplier 130, in which an example of n-bit modular multiplication using Formula 1 is shown in a total of 10-stage pipeline structure up to maximum 256 bits.

It is composed of partial product (stage 1~4) using a DSP (digital signal processing) device; accumulation of intermediate multiplication results (stage 5~7); and reduction of accumulated result into a modular space (stage 8~10).

Let n-bit multiplication $m = 2^n/b$ [Formula 1]

$$xy = \sum_{i=0}^{m-1} x_i y_i b^{2i} + \sum_{i=0}^{m-2} \sum_{j=i+1}^{m-2} [(x_i+x_j)(y_i+y_j) - x_i y_i - x_j y_j] b^{(i+j)}$$

In stage 1, $x_i+x_j$ and $y_i+y_j$ are calculated for $i=(0, 1 \ldots, m-2)$ and $j=(i+1, i+2, \ldots m-2)$ in Formula 1 using a 16-bit RCA (ripple carry adder).

In formula 1, $m=2^n/b$, wherein b is $2^{16}$ which is DSP data size.

In stage 1-2, $x_i y_i$ is calculated for $i=(0, 1, \ldots m-1)$ using a 16-bit multiplier.

In stage 2-3, $x_i+x_j$ and $y_i+y_j$ calculated using the 16-bit RCA in stage 1 are multiplied using a 17-bit MACC (multiply and accumulate) and $(x_i+x_j)(y_i+y_j)−x_i y_i$ in Formula 1 is calculated finally for $i=(0, 1, \ldots, m-2)$ and $j=(i+1, i+2, \ldots m-2)$ by calculating with $x_i y_i$ calculated in stage 1-2.

In stage 4, $(x_i+x_j)(y_i+y_j)−x_i y_i−x_j y_j$ in Formula 1 is calculated by calculating $x_j y_j$ on the result calculated by 17-bit MACC in stage 2-3 using a 34-bit adder.

In stage 5-7, $$\sum_{i=0}^{m-1} x_i y_i b^{2i} + \sum_{i=0}^{m-2} \sum_{j=i+1}^{m-2} [(x_i+x_j)(y_i+y_j) - x_i y_i - x_j y_j] b^{(i+j)}$$

in Formula 1 is finally calculated by arranging and adding the result of $x_i y_i$ calculated and the intermediate multiplication result calculated on $(x_i+x_j)(y_i+y_j)−x_i y_i−x_j y_j$ in stage 1-2.

It is possible to use a CSAT (Carry Save Adder Tree) when accumulating intermediate multiplication results.

In stage 8-10, the multiplication result is reduced in accordance with a modular space. When n=256, as in the example, in n-bit modular multiplication, the size of output in stage 7 is 512 bits.

As an example of reducing into a modular space, there is a method of reducing 512-bit input into 256 bits, as in the formula in Table 3.

TABLE 3

Fast reduction modulo $p_{256} = 2^{256} − 2^{224} + 2^{192} + 2^{96} − 1$

Input: An integer $c = (c_{15}, \ldots, c_0)$ in base $2^{32}$ with $0 \le c \le p_{256}^2$ 1. Define 256-bit integers:
$s_1 = c_7, c_6, c_5, c_4, c_3, c_2, c_1, c_0$),
$s_2 = (c_{15}, c_{14}, c_{13}, c_{12}, c_{11}, 0,0,0 )$,
$s_3 = (0, c_{15}, c_{14}, c_{13}, c_{12}, 0,0,0)$,
$s_4 = (c_{15}, c_{14}, 0,0,0, c_{10}, c_9, c_8)$,
$s_5 = (c_8, c_{13}, c_{15}, c_{14}, c_{13}, c_{11}, c_{10}, c_9)$,
$s_6 = (c_{10}, c_8, 0,0,0, c_{13}, c_{12}, c_{11})$,
$s_7 = (c_{11}, c_9, 0,0, c_{15}, c_{14}, c_{13}, c_{12})$,
$s_8 = (c_{12}, 0, c_{11}, c_{10}, c_9, 0, c_{15}, c_{14})$,
$s_9 = (c_{13}, 0, c_{11}, c_{10}, c_9, 0, c_{15}, c_{14})$,
2. Return $(s_1 + 2s_2 + 2s_3 + s_4 + s_5 − s_6 − s_7 − s_8 − s_9 \mod p_{256})$ In the formula of Table 3, a final calculation result is output and reduced in a $p_{256}$ space in stage 9-10 by inputting a result, which is obtained by inputting the result of adding $s_1+2s_2+2s_3+s_4+s_5$ and $4p_{256}$ as the first CSAT input in stage 8 and inputting $−s_6−s_7−s_8=s_9$ as a second CSAT input in order to implement the result in the formula of Table 3 using only addition.

Figure 5:
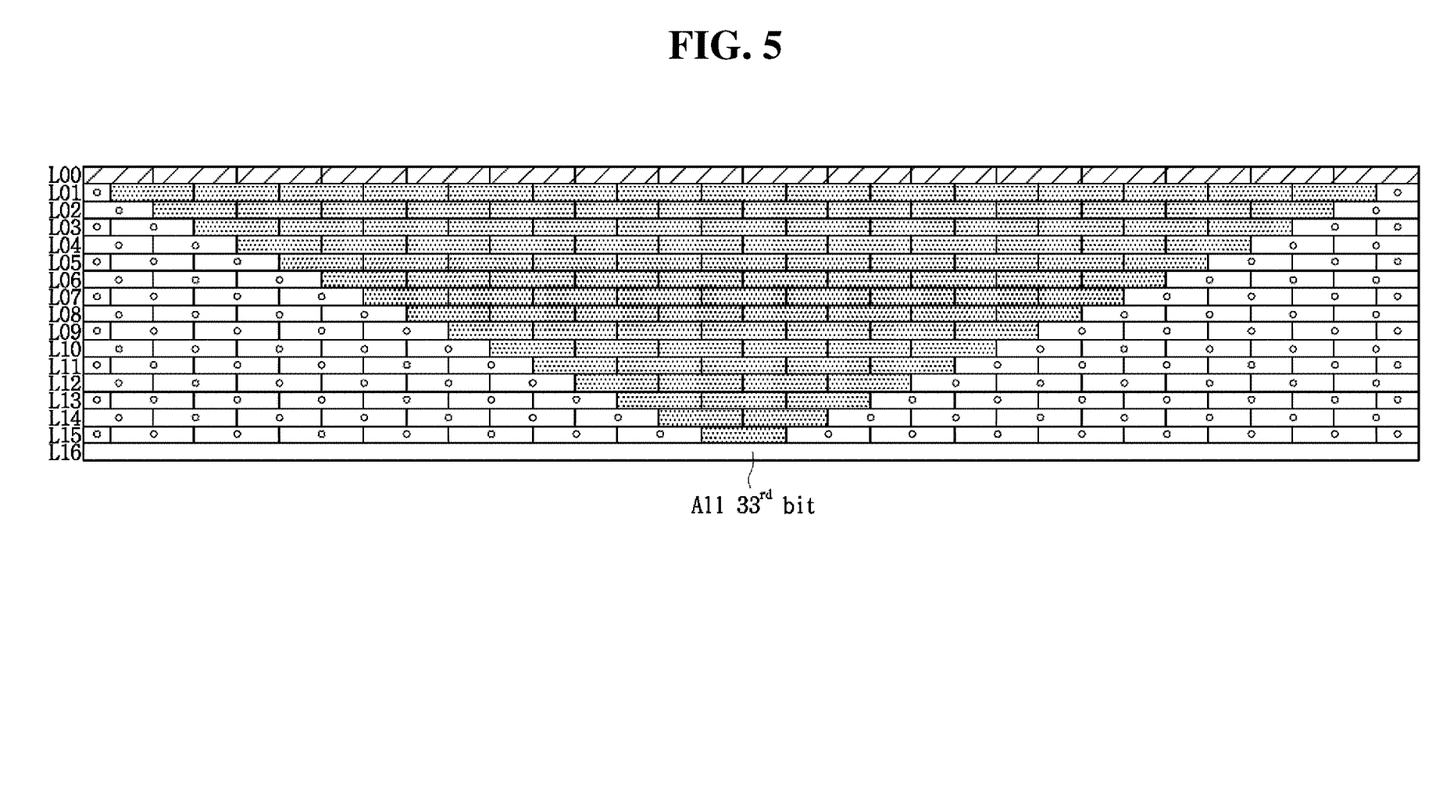
FIG. 5 is a configuration diagram showing a mapping method for accumulating intermediate multiplication results of a modular multiplication process according to an embodiment of the present disclosure.
Figure 6:
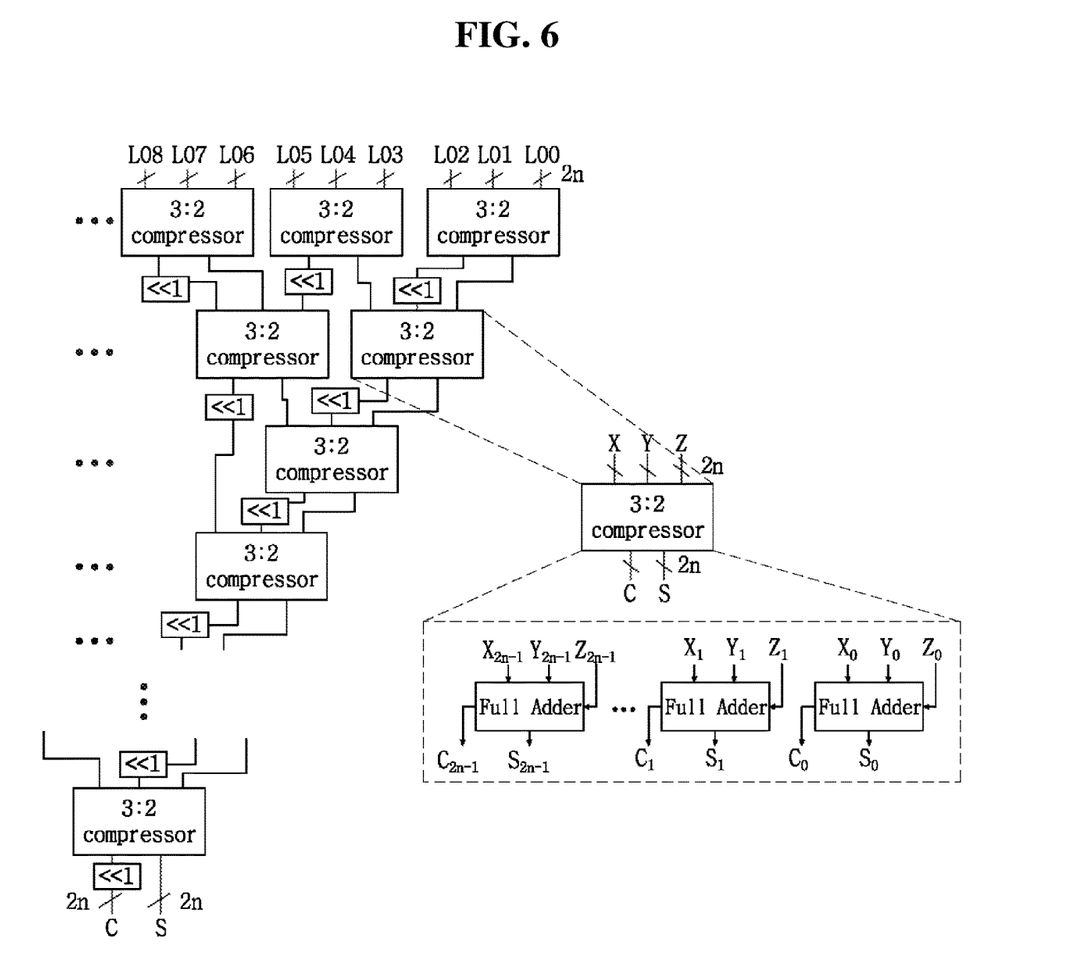
FIG. 6 is a configuration diagram showing a CSAT (Carry Save Adder Tree) of a modular multiplication process according to an embodiment of the present disclosure.

FIG. 5 is a configuration diagram showing a mapping method for accumulating intermediate multiplication results of a modular multiplication process according to an embodiment of the present disclosure and FIG. 6 is a configuration diagram showing a CSAT (Carry Save Adder Tree) of a modular multiplication process according to an embodiment of the present disclosure.

FIG. 5 expresses a calculation result of $x_i y_i$ and $(x_i+x_j)(y_i+y_j)−x_i y_i−x_j y_j$ in Formula 1 in blocks.

The calculation result of $x_i y_i$ has a size of 32 bits and the calculation result of $(x_i+x_j)(y_i+y_j)−x_i y_i−x_j y_j$ has a size of 33 bits.

That is, it was calculated by 34-bit RCA, but according to the final result of subtraction and the formula, the maximum size of the final result is 33 bits.

The calculated $x_i y_i$ result is L00. An MSB (Most Significant Bit) that is the 33-th bit of the calculation result of $(x_i+x_j)(y_i+y_j)−x_i y_i−x_j y_j$ is collected in the last layer, and the intermediate layers are blocks of calculation result of the other 32 bits.

When the values in a block are calculated vertically, the magnitude of the final accumulation result using the CSAT is 2n bits.

The example of FIG. 5 shows a mapping method of outputting 512 bits using L00~L16 layers.

Referring to FIG. 6, it is possible to output a result by performing addition in accordance with the layers to which intermediate multiplication results are mapped, as shown in FIG. 5. When 2n is input, the CSAT may be a 3:2 compressor composed of 2n full adders.

The system and method for calculating elliptic curve cryptography multiplication using an FPGA according to the present disclosure described above improves performance by implementing modular calculation, which is used in a Montgomery ladder algorithm, in a pipeline structure, has a safe structure in comparison to implementing it as software by implementing an FPGA, and can be replaced at a low cost, thereby having a flexible structure.

It would be understood that the present disclosure was implemented in a modification type without departing from the essential characteristic of the present disclosure, as described above.

Accordingly, the embodiments stated herein should be considered in terms of not limitative viewpoint, but explanatory view point, the range of the present disclosure is described not in the above description, but claims, and all differences should be construed as being included in the present disclosure.

What is claimed is:

1. A system for calculating ECC (Elliptic Curve Cryptography) scalar multiplication using an FPGA, the system comprising a Montgomery ladder step calculator scheduling for ECC scalar multiplication,
    wherein the Montgomery ladder step calculator includes:
    a scheduler implementing Montgomery ladder step calculation in a pipeline structure;
    a pipeline modular adder/subtractor implementing n-bit modular addition in a d-stage pipeline structure; and
    a modular multiplier implementing n-bit modular multiplication in a 10-stage pipeline structure up to maximum 256 bits,
    wherein the scheduler
    schedules Montgomery ladder step calculation (4 and 5 processes) in a pipeline structure in the Montgomery ladder algorithm of
    1 $(Q,R) \leftarrow (P, 2P)$
    2 $(k_{n-1}, \ldots k_0) = (k)_2$
    3 For i=n−1 down to 0:
    4 If $k_i=0$: $(Q,R) \leftarrow (2Q, Q+R)$
    5 Else: $(Q,R) \leftarrow (Q+R, 2R)$
    6 Output $Q = k \cdot P$, and
    maps calculation for points P, Q, and R to points (P, Q+R, 2R)=(P, S, T) and schedules them in the algorithm changed into a Jacobian coordinate system in the 4 and 5 processes.

2. The system of claim 1, wherein the modular multiplier performs intermediate multiplication of a mixed Karatsuba algorithm using a digital signal processor, accumulation by mapping intermediate multiplication results; and reducing the accumulated results into a modular space.

3. A method for calculating ECC scalar multiplication using an FPGA, the method comprising:
    partial product of a mixed Karatsuba algorithm using a digital signal processor by means of the modular multiplier;
    an accumulation step of mapping intermediate multiplication results; and
    a step of reducing the accumulated results into a modular space, in order for Montgomery ladder step calculation in a system for calculating ECC scalar multiplication including a Montgomery algorithm scheduler, a modular adder, and a modular multiplier,
    wherein the modular multiplier has a 10-stage pipeline structure composed of partial product (stage 1~4) using a DSP (digital signal processing) device; accumulation of intermediate multiplication results (stage 5~7); and reduction of accumulated result into a modular space (stage 8~10),
    wherein the modular multiplier calculates Let n-bit multiplication $m = 2^n/b$ $$xy = \sum_{i=0}^{m-1} x_i y_i b^{2i} + \sum_{i=0}^{m-2} \sum_{j=i+1}^{m-2} [(x_i + x_j)(y_i + y_j) - x_i y_i - x_j y_j] b^{(i+j)},$$

and
    calculates $x_i + x_j$ and $y_i + y_j$ for i=(0, 1, ..., m−2) and j=(i+1, t+2, m−2) using a 16-bit RCA (Ripple Carry Adder) in stage 1, wherein $m = 2^n/b$ and b is $2^{16}$ which is DSP data size.

4. The method of claim 3, wherein
    in the stage 1-2, $x_i y_i$ is calculated for i=(0, 1, ..., m−1) using 16-bit multiplier, and
    in the stage 2-3, $x_i + x_j$ and $y_i + y_j$ calculated using the 16-bit RCA in stage 1 are multiplied using a 17-bit MACC (multiply and accumulate) and $(x_i + x_j)(y_i + y_j) - x_i y_i$ is calculated finally for i=(0, 1, ..., m−2) and j=(i+1, i+2, ... m−2) by calculating with $x_i y_i$ calculated in the stage 1-2.

5. The method of claim 4, wherein, in the stage 4, $(x_i x_j)(y_i + y_j) - x_i y_i - x_i y_j$ is calculated by calculating $x_j y_j$ on the result calculated by 17-bit MACC in the stage 2-3 using a 34-bit adder.

6. The method of claim 5, wherein, in the stage 5-7, $$\sum_{i=0}^{m-1} x_i y_i b^{2i} + \sum_{i=0}^{m-2} \sum_{j=i+1}^{m-2} [(x_i + x_j)(y_i + y_j) - x_i y_i - x_j y_j] b^{(i+j)}$$

is finally calculated by arranging and adding the result of $x_i y_i$ calculated and the intermediate multiplication result calculated on $(x_i + x_j)(y_i + y_j) - x_i y_i - x_j y_j$ in the stage 1-2.

7. The method of claim 6, wherein a CSAT (Carry Save Adder Tree) is used when accumulating intermediate multiplication results, and
    in the stage 8-10, the multiplication result is reduced in accordance with a modular space.

* * * * *